E. C. REEDER & F. A. KEMP.
MECHANICAL CLUTCH.
APPLICATION FILED APR. 3, 1914.
1,125,595.
Patented Jan. 19, 1915.
2 SHEETS—SHEET 2.
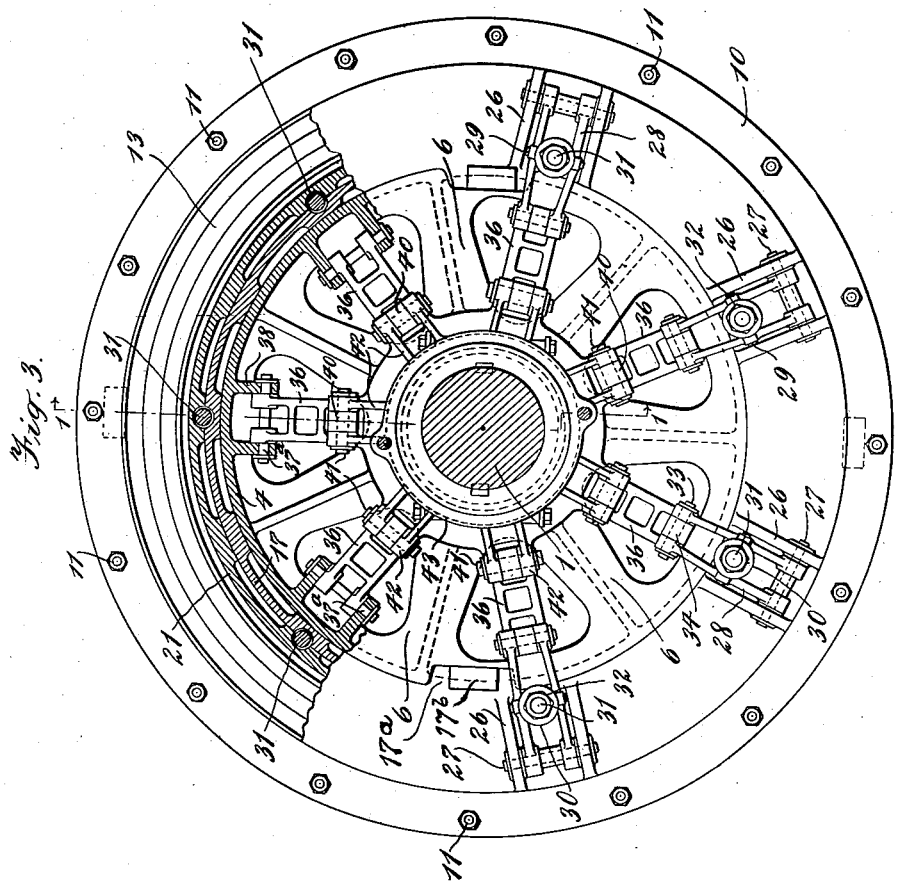
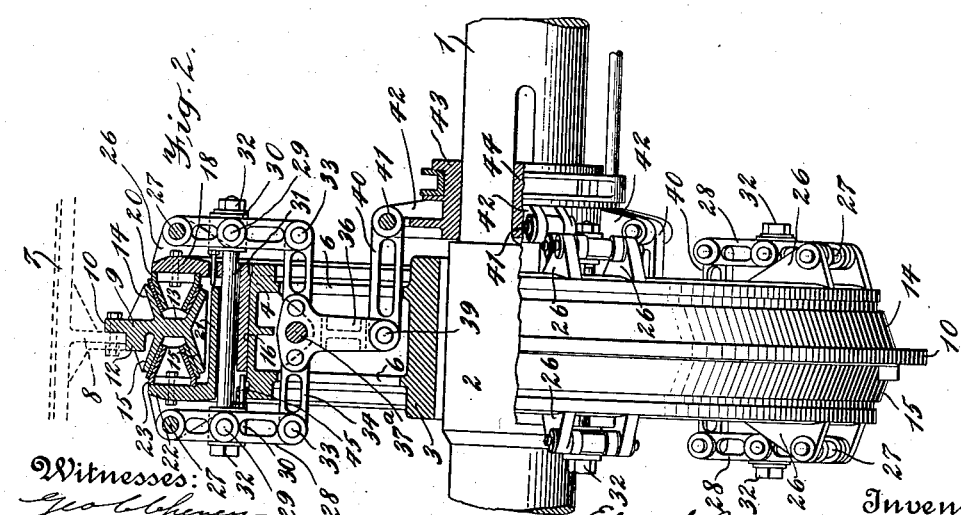

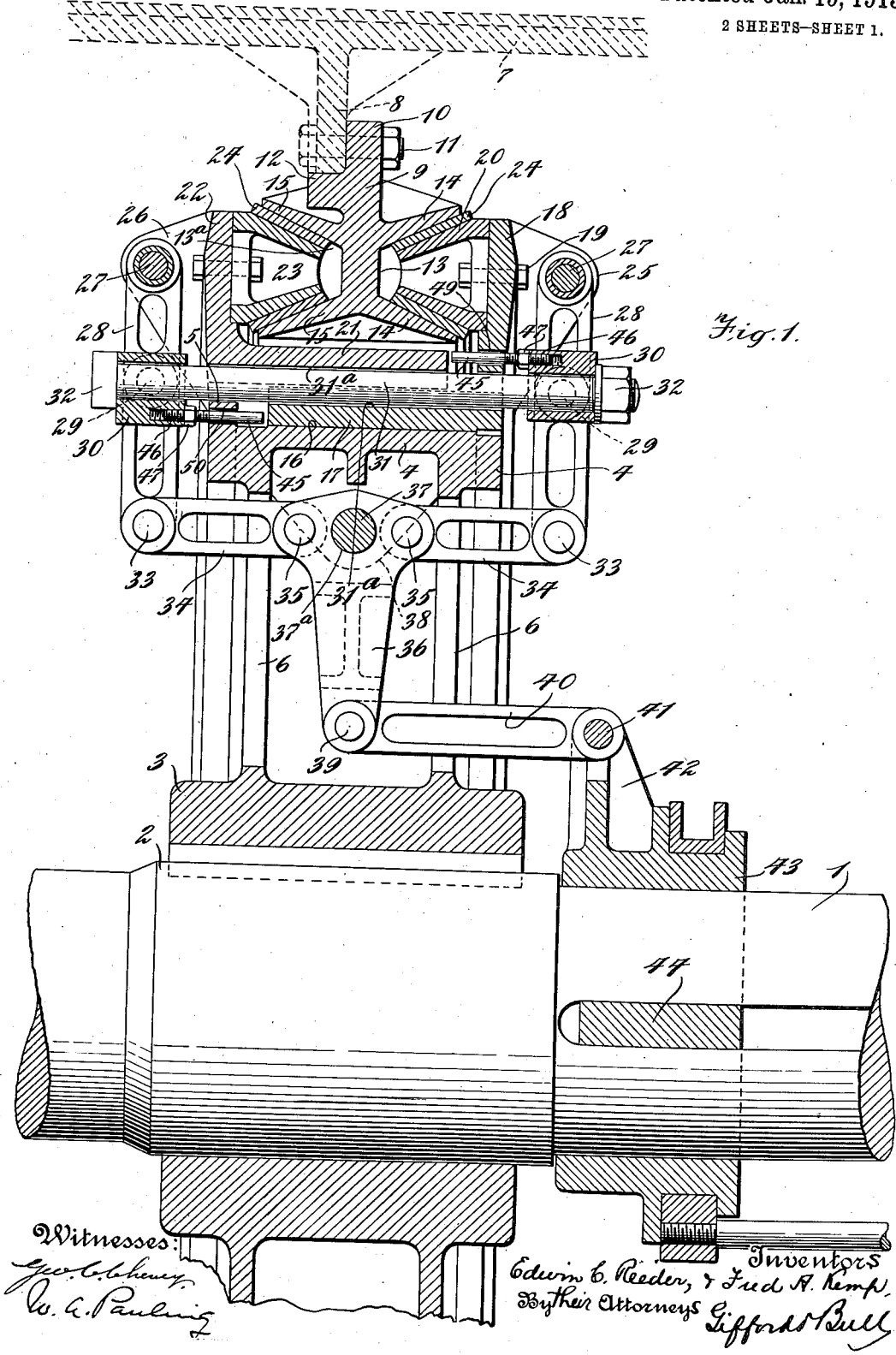

UNITED STATES PATENT OFFICE.

EDWIN C. REEDER, OF CHICAGO, ILLINOIS, AND FRED A. KEMP, OF NEW YORK, N. Y., ASSIGNORS TO LIDGERWOOD MANUFACTURING COMPANY, OF NEW YORK, N. Y., A CORPORATION OF NEW YORK.

MECHANICAL CLUTCH.

1,125,595.    Specification of Letters Patent.    Patented Jan. 19, 1915.

Application filed April 3, 1914. Serial No. 829,174.

*To all whom it may concern:*

Be it known that we, EDWIN C. REEDER, a citizen of the United States, residing at Chicago, in the county of Cook and State of Illinois, and FRED A. KEMP, a subject of the Czar of Russia, residing at New York city, in the county of New York and State of New York, have invented certain new and useful Improvements in Mechanical Clutches, of which the following is a specification.

Our invention relates to new and useful improvements in mechanical clutches, and more particularly to clutches of the type which includes a double-faced member with which are adapted to coöperate, opposed clutch elements each engaging a face of said member, to couple said member and elements together.

The invention consists in the improvements to be more fully described hereinafter and the novelty of which will be particularly pointed out and distinctly claimed.

We have fully and clearly illustrated our invention in the accompanying drawings to be taken as a part of this specification, and wherein:

Figure 1 is a vertical longitudinal section through a portion of a clutch embodying our invention, the same being taken on the line 1—1 of Fig. 3. Fig. 2 is a view in side elevation of a clutch embodying our invention, portions being shown in elevation and other portions in longitudinal section. Fig. 3 is a front elevation of the clutch shown in Figs. 1 and 2 with parts broken away and in section.

Referring to the drawings by characters of reference, 1 designates a shaft of any desired construction which may be either a driving shaft or a driven shaft according to whether power is to be derived therefrom or applied thereto. This shaft is provided with a cylindrical portion 2 preferably of greater diameter than the main body of the shaft and upon which is keyed the hub 3 of a substantially cylindrical coupling member 4, the latter being provided at one edge with a circumferential radially-extending flange 5 which serves a purpose to be presently set forth. The coupling member 4 is preferably connected to its hub 3 by spokes or webs 6.

7 designates an annular member which may be either the driven or driving member according to whether or not the shaft 1 is the driving or driven member. Said member 7 may be a pulley, drum, or any other element which it is desired to mechanically and rotatively connect to the shaft 1. This annular member 7 surrounds the shaft and the coupling member 4, and may be provided with an inwardly-extending radial circumferential flange 8 which is adapted to have rigidly secured thereto a double-faced clutch member. This clutch member may take a variety of forms specifically, but we prefer to construct the same in the form of an integral structure consisting of a ring member 9 having an attaching flange 10 secured by clamping bolts 11 to the inner edge of said flange 8. The member 9 may be provided with a laterally-extending annular flange 12 to abut the inner edge of the flange 8 so as to brace and stiffen the connection between the member 9 and said flange 8 and prevent lateral movement of the member 9. On its opposite side faces the member 9 is provided with annular cone-faced friction channels 13 formed by circumferential concentric flanges 14, 14, and 15, 15, the inner faces of which are inclined inwardly toward the member 9 to form said cone-faced channels.

Carried by and supported on the coupling hub 4, and located respectively on opposite sides of the member 9, are oppositely acting clutch elements adapted to coöperate with said cone-faced channels 13 to couple the member 9 to said member 4. In the preferred embodiment these oppositely operating clutch elements may be constructed as follows:

Slidably mounted on the outer cylindrical face 16 of the member 4 is a cylindrical sleeve 17 having at its outer end a radially-extending circumferential flange 18 which extends radially to a point opposite the double-faced channel 13 on one side of the member 9. Bolted, as at 19, or otherwise rigidly secured to the said flange 18, is an annular cone-faced friction ring 20 adapted to enter the space between the flanges 14, 14, and frictionally engage the inner faces of the latter to connect the element 17 to the member 9. The sleeve 17 is keyed or otherwise secured to the member 4 so as to be slidable longitudinally of the latter, but fixed thereto to rotate therewith; for instance, by lugs 17ª straddling a projection 17ᵇ on the member 4.

Surrounding the cylindrical sleeve 17 and the cylindrical portion of the coupling member 4 is a second sleeve 21, which is keyed to said sleeve 17 to slide longitudinally thereof, but to rotate therewith and with said member 4, as will be presently set forth. At the opposite end of said sleeve 21 from that adjacent the flange 18, said sleeve 21 is provided with a radially-extending circumferential flange 22 projecting outwardly opposite the space between the flanges 15, 15, and carrying on its inner face an annular cone-faced friction member 23 adapted to enter the channel 13ª and to engage the inner faces of said flanges 15, 15, to frictionally connect said sleeve 21 with the member 9. The friction elements 20 and 23 may be provided on their outer faces with suitable friction material 24 so as to provide for a strong frictional engagement between said friction rings and the flanges 14, 15.

In order to reduce the amount of friction between the sleeves 17 and 21, and the sleeve 17 and the face 16 to a minimum, we provide bearing ribs 17ª between the said parts so as to provide for as small bearing area as is practicable, said ribs being formed on the inner faces of said sleeves.

We will now describe a preferred form of means for operating the clutch sleeves 17 and 21 to move the elements 20 and 23 into and out of engagement with the channel friction grooves 13, 13ª, of the member 9: Rigidly connected with the outer faces of the flanges 18, 22, and spaced equidistant about said flanges, are pairs of bearing ears 25, 26, in which are mounted bearing pins 27 upon which are fulcrumed the upper ends of operating levers 28, the latter being fulcrumed at points intermediate their ends upon studs 29 projecting laterally from sleeves 30 slidably mounted upon the ends of thrust members 31 arranged equidistant about the coupling member 4. These thrust members are preferably in the form of bolts and extend through openings formed by registering grooves 31ª formed, respectively, in the inner face of the sleeve 21 and the outer face of the sleeve 17 and extending lengthwise of said sleeves, and spaced apart equidistant circumferentially of said sleeves, said bolts being free to have play lengthwise in said guide openings. The bolts 31 are provided at their ends beyond said sleeves 30 with heads 32 constituting abutments, for a purpose which will be presently set forth. The sleeve 21 is keyed to the member 4 in any suitable manner, preferably by lugs thereon straddling a projection on the member 4 in the same manner as described for the sleeve 17.

At their ends opposite to those mounted upon the pins 27, the levers 28 are connected by pivot pins 33 with the outer ends of links 34, the inner ends of said links being pivotally connected, as at 35, to the opposite ends of rocking operating levers 36, said levers being fulcrumed, as at 37, between their points of connection with said links, upon pins 37ª having bearing in ears 38 extending inwardly from the inner surface of the rim of the member 4. The levers 36 are each connected at one end, as at 39, to one end of a connecting link 40, the opposite end of which links are pivotally connected, as at 41, to a flange 42 on an operating sleeve 43, which is slidably mounted upon the shaft 1, and is preferably keyed thereto, as at 44. These levers 36 are so arranged that when swung in one direction they serve to spread the inner ends of the levers 28, to apply the friction, while when moved in the opposite direction the inner ends of said levers are drawn toward each other to relieve the frictional engagement between the elements 20, 23, and the member 9. When the levers 28 are spread, as shown in Figs. 1 and 2, the pins 33, levers 34, pins 35 and fulcrum 37 are dead centered whereby the frictional engagement is maintained.

The parts being as above described, and as shown in Figs. 1 and 2, wherein the elements are coupled to provide for a driving engagement between the shaft 1 and the element 7, the clutch is operated as follows to disengage or disconnect the members 1 and 7: The operator slides the operating sleeve 43 lengthwise of the shaft, in a direction away from the hub 3, thereby breaking the dead center connection between the lever 36, links 34 and the levers 28, and permitting the lower or inner ends of the levers 28 to move inwardly, swinging the same on their fulcrums 29, thereby moving the upper ends of said levers 28 outwardly and relieving the frictional engagement between the friction elements 20, 23, and the flanges 14, 15, respectively. When it is desired to couple the parts, the operator forces the sleeve 43 in a direction toward the hub 3, which will serve to operate the levers 36 to spread the lower ends of the levers 28, which will serve first to move the sleeves 30 positively against the heads 32 on the bolts 31 and, by reaction against said heads, cause the upper or outer ends of said levers 28 to move inwardly and force the elements 20 and 23 into engagement with the friction flanges 14, 15 on the member 9.

Means is provided for positively separating the members 20 and 23 from the flanges 14 and 15, when the clutch parts are to be disconnected, so that, during the rotation of either the driving or driven member, the clutch faces will not run in engagement with each other and, for the further purpose of maintaining both of the elements 20 and 23 in proper parallelism with each other and with the friction faces of the flanges 14, 15. We accomplish this result by providing each of the sliding sleeves 30, preferably, with thrust pins 45 adjustably threaded into the inner faces of said sleeves, as at 46, and held in proper adjusted relation to said sleeves by clamping nuts 47. These thrust pins 45 at one side of the clutch structure extend inwardly through guide openings 49 in the flange 18, while the thrust pins on the opposite side of the clutch structure extend inwardly through guide openings 50 in the flange 5, the inner ends of the first-named pins taking a position opposite the inner end of the sleeve 21, while those of the second-named pins take a position opposite the inner end of the sleeve 17. These pins are so arranged and adjusted that, when the operating levers 36 are manipulated to relieve the frictional engagement between the elements 20 and 23 with the member 9, said pins 45 are moved into engagement with the sleeves 17, 21, and thereby positively move said sleeves outward so that the clutch elements 20 and 23 are moved out of engagement with the member 9 throughout their entire circumference and at the same time are maintained in proper parallel relation to said member 9. It will be understood that the pins 45, by virtue of their threaded connection with the sleeves 30, may be readily adjusted to accomplish the purpose stated. When the levers 36 are moved to apply the friction, the pins 45 are moved outwardly with the sleeves 30 so as not to interfere with the movement of the sleeves 17 and 21 in being moved to apply the friction.

What we claim and desire to secure by Letters Patent of the United States is:—

1. In a clutch, in combination, a double-faced member, oppositely disposed clutch elements adapted to engage the faces of said member, thrust members, levers pivoted to said elements and fulcrumed on said thrust members, and operating means connected to said levers to swing the same on their fulcrums.

2. In a clutch, in combination, a double-faced member, oppositely disposed clutch elements adapted to engage the faces of said member, thrust members, sleeves slidably mounted on the opposite ends of said thrust members, levers pivoted to said elements and fulcrumed on said sleeves, and operating means connected to said levers to swing the same on the said fulcrums.

3. In a clutch, in combination, a double-faced member, oppositely disposed clutch elements adapted to engage the faces of said member, thrust members having abutments on their opposite ends, sleeves slidably disposed on said thrust members, levers pivoted to said elements and fulcrumed intermediate their ends on said sleeves, and operating means connected to said levers to swing the same on their fulcrums.

4. In a clutch, in combination, a double-faced member, oppositely disposed clutch elements adapted to engage the faces of said member, thrust members, levers pivoted at one end to said elements and fulcrumed intermediate their ends on said thrust members, and operating means acting on the opposite ends of said levers from those pivoted to said elements, to swing said levers on their fulcrums.

5. In a clutch, in combination, a double-faced member, oppositely disposed clutch elements adapted to engage the faces of said member, thrust members, levers pivoted at one end to said elements and fulcrumed intermediate their ends on said thrust members, operating means acting on the opposite ends of said levers from those pivoted to said elements, to swing said levers on their fulcrums, and thrust means operated by said levers for positively engaging said elements to disengage the same from said member.

6. In a clutch, in combination, a double-faced member, oppositely disposed clutch elements adapted to engage the faces of said member, thrust members, levers pivoted at one end to said elements and fulcrumed intermediate their ends on said thrust members, operating means acting on the opposite ends of said levers from those pivoted to said elements, to swing said levers on their fulcrums, and thrust pins operated by said levers for positively engaging said elements to disengage the same from said member.

7. In a clutch, in combination, a double-faced member, oppositely disposed clutch elements adapted to engage the faces of said member, thrust members, levers pivoted at one end to said elements and fulcrumed intermediate their ends on said thrust members, operating means acting on the opposite ends of said levers from those pivoted to said elements, and thrust pins carried by said levers for positively engaging said elements to disengage the same from said member.

8. In a clutch, in combination, a double-faced member, oppositely disposed clutch elements adapted to engage the faces of said member, thrust members, operating levers pivoted to said clutch elements at one end and fulcrumed on said thrust members intermediate their ends, links connected to the opposite ends of said levers from their pivoted ends, operating levers pivoted to said links, and means for simultaneously operating said operating levers.

9. In a clutch, in combination, a double-faced clutch member, a clutch hub, sleeves surrounding said hub and movable lengthwise thereof, each sleeve carrying a clutch element adapted to coöperate with one of the faces of said clutch member, thrust members, fulcrum sleeves slidably mounted on said thrust members, operating levers pivoted to said clutch elements at one end and fulcrumed intermediate their ends on said sleeves, means for swinging said levers on their fulcrums and thrust pins carried by said fulcrum-sleeves and adapted to engage the sleeves carrying the thrust elements to positively move the latter out of engagement with the clutch member.

10. In a clutch, in combination, a double-faced member, oppositely disposed clutch elements adapted to engage the faces of said member, thrust members, sleeves slidably mounted on the opposite ends of said thrust members, levers pivoted to each of said elements and fulcrumed on said sleeves, operating means connected to said levers to swing the same on their fulcrums, and thrust devices carried by said sleeves and adapted to engage the clutch elements to disengage the same from said clutch member.

11. In a clutch, in combination, a double-faced member, oppositely disposed clutch elements adapted to engage the faces of said member, thrust members, sleeves slidably mounted on the opposite ends of said thrust members, levers pivoted to each of said elements and fulcrumed on said sleeves, operating means connected to said levers to swing the same on their fulcrums, and thrust pins adjustably threaded in said sleeves and adapted to engage said clutch elements to disengage the same from said member.

In testimony whereof we have hereunto signed our names in the presence of two subscribing witnesses.

EDWIN C. REEDER.
FRED A. KEMP.

Witnesses to signature of Edwin C. Reeder:
  C. H. WARDEN,
  A. E. JOHNSON.

Witnesses to signature of Fred A. Kemp:
  C. G. HEYLMUN,
  M. E. McNINCH.